United States Patent [19]

Rinehart

[11] 4,055,703

[45] Oct. 25, 1977

[54] ION EXCHANGE STRENGTHENED GLASS CONTAINING $P_2O_5$

[75] Inventor: Dale W. Rinehart, Natrona Heights, Pa.

[73] Assignee: PPG Industries, Inc., Pittsburgh, Pa.

[21] Appl. No.: 706,660

[22] Filed: July 19, 1976

Related U.S. Application Data

[63] Continuation-in-part of Ser. No. 605,108, Aug. 15, 1975, Pat. No. 4,015,045, which is a continuation-in-part of Ser. No. 432,006, Jan. 9, 1974, abandoned.

[51] Int. Cl.² .................. B32B 17/00; C03C 21/00
[52] U.S. Cl. .................................. 428/410; 106/52; 65/30 E; 65/30 R; 428/218
[58] Field of Search ............... 428/410, 218; 65/30 R, 65/30 E; 106/52

[56] References Cited

U.S. PATENT DOCUMENTS

| | | | |
|---|---|---|---|
| 3,357,876 | 12/1967 | Rinehart | 65/30 E |
| 3,485,647 | 12/1969 | Harrington | 65/30 E |
| 3,485,702 | 12/1969 | Mochel | 65/30 E |
| 3,498,773 | 3/1970 | Grubb | 65/30 E |
| 3,498,801 | 3/1970 | Keul | 106/39.7 |
| 3,778,335 | 12/1973 | Boyd | 65/30 E |
| 3,790,430 | 2/1974 | Mochel | 65/30 E |
| 3,907,577 | 9/1975 | Kiefer | 65/30 E |

Primary Examiner—Ellis Robinson
Attorney, Agent, or Firm—Dennis G. Millman

[57] ABSTRACT

An alkali-alumina-silica-zirconia glass capable of being chemically strengthened by exchanging sodium ions in the glass with potassium ions from an external source below the strain point of the glass has its ion exchange rate increased by incorporating 2 to 20 percent $P_2O_5$ into the initial glass composition.

16 Claims, 3 Drawing Figures

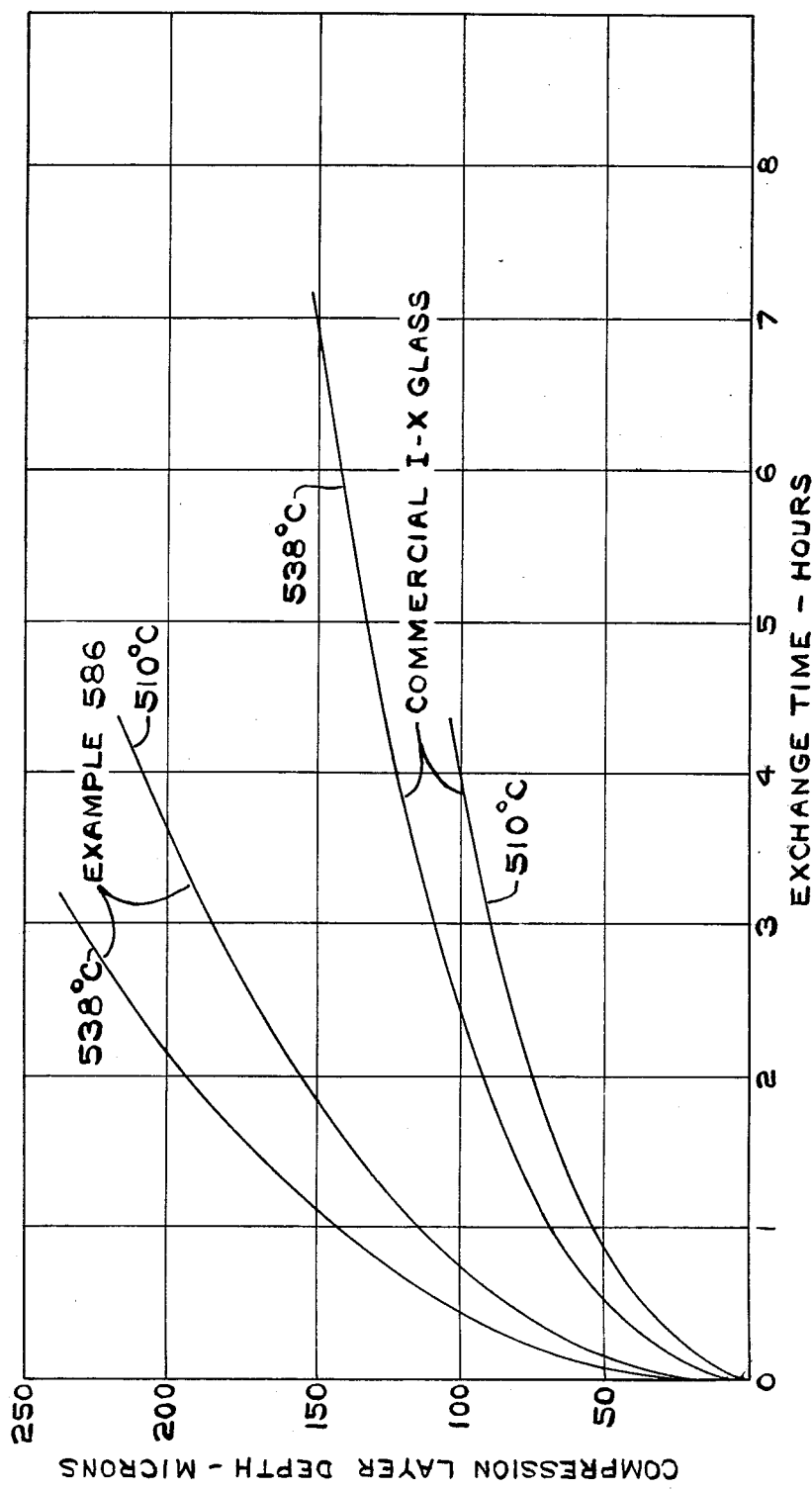

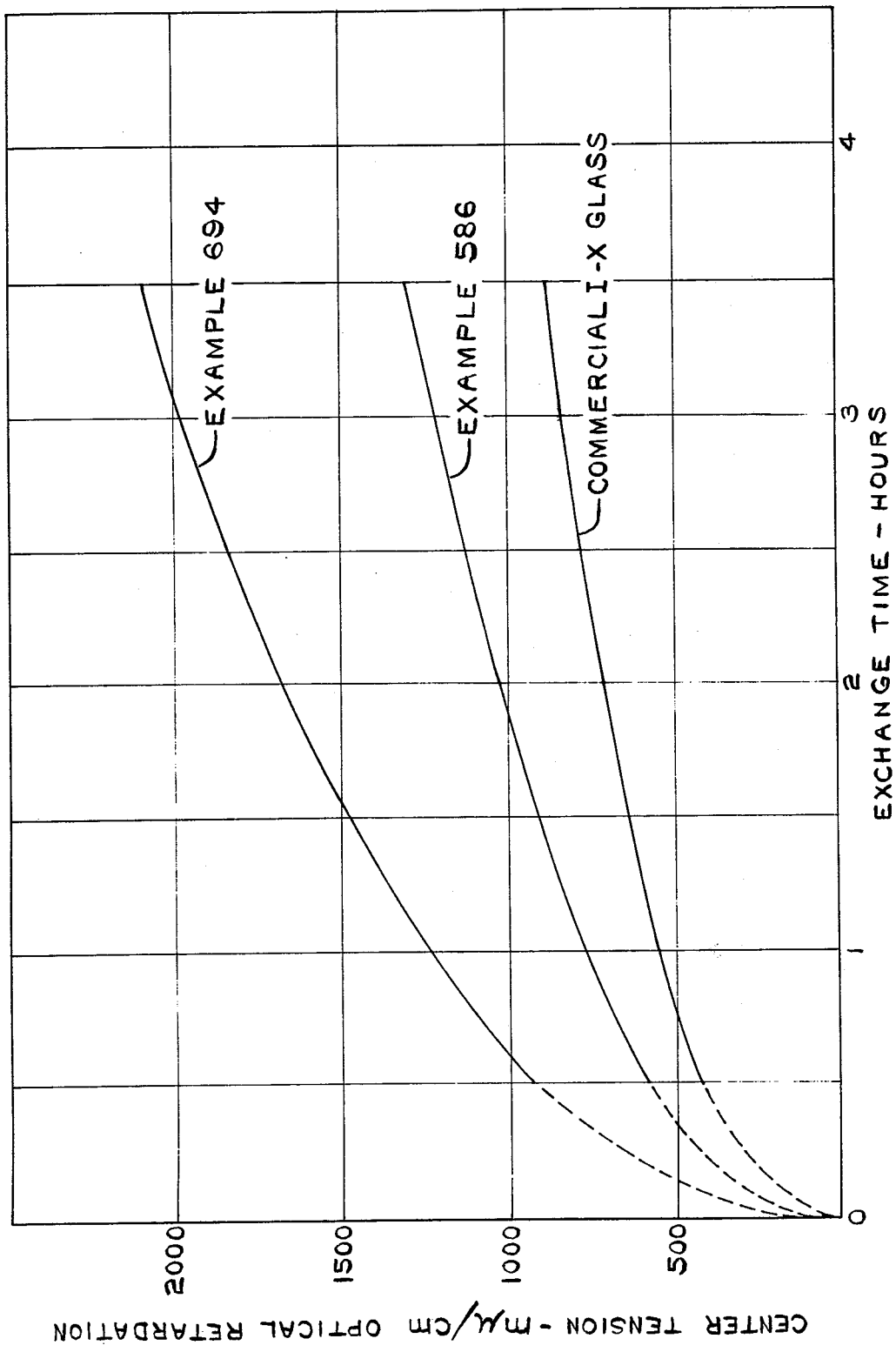

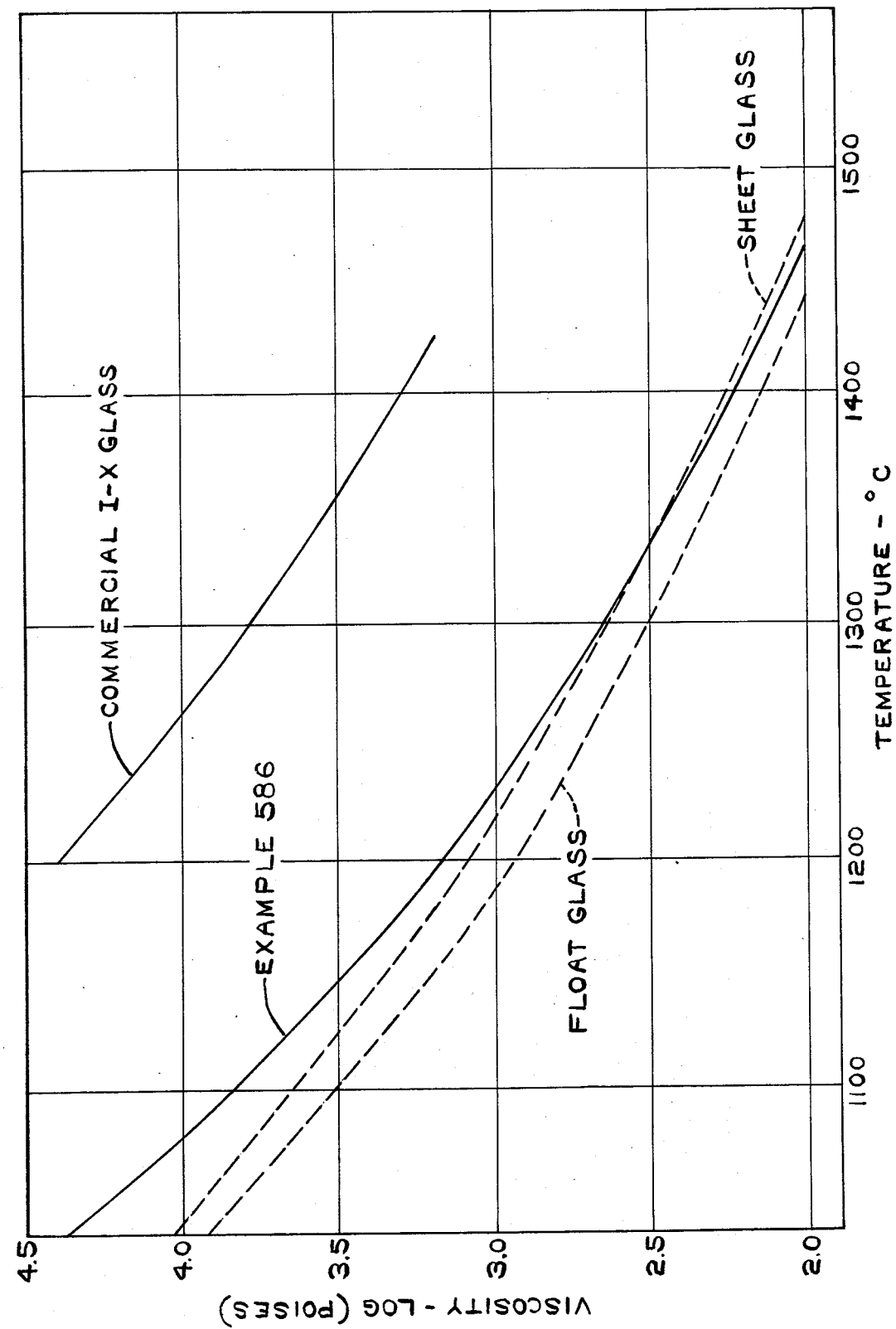

ION EXCHANGE STRENGTHENED GLASS CONTAINING $P_2O_5$

CROSS-REFERENCE TO RELATED APPLICATIONS

This application is a continuation-in-part of application Ser. No. 605,108, filed Aug. 15, 1975 now U.S. Pat. No. 4,015,045, which was a continuation-in-part of application Ser. No. 432,006, filed Jan. 9, 1974, now abandoned.

This application is also related in subject matter to applicant's copending application Ser. No. 706,661, filed on even date herewith, entitled CHEMICALLY STRENGTHENED OPAL GLASS.

BACKGROUND OF THE INVENTION

This invention relates to glass compositions and articles made therefrom which are essentially transparent to visible light and are capable of being ion exchange strengthened at an exceptionally high rate of speed. Moreover, the novel glasses of the present invention are rendered suitable for large scale production and subsequent use in automotive, aircraft, architectural, tableware and other applications by virtue of their low melting temperatures and high degree of resistance to chemical attack.

Ion exchange strengthening (or "chemical tempering") of glass involves an exchange of ions near the surface of the glass article with ions from an external source, typically a molten inorganic salt bath, the object being the generation of a zone near the surface of the glass which is in a state of compression relative to the interior portions of the glass. There are two types of ion exchange strengthening which differ substantially in theory and operation. The first type of ion exchange treatment is carried out above the strain point of the glass and has as its object the alteration of the glass composition at the surface so as to lower the thermal coefficient of expansion in the surface layer. As the glass is cooled, a compressive stress develops at the surface due to the expansion differential. This approach was taught by Hood and Stookey in U.S. Pat. No. 2,779,136. The second type of ion exchange strengthening is characterized by treatment below the strain point of the glass, wherein surface compression is generated by substituting large ions from an external source (e.g., a molten salt bath) for smaller ions in the glass. Typically, the substitution is of sodium or potassium for lithium in the glass, or of potassium for sodium in the glass. The below-the-strain-point technique was first taught by Weber in U.S. Pat. No. 3,218,220.

Of the two types of ion exchange strengthening, the second (below the strain point) type is preferred for large-scale commercial use. This is because maintaining the glass below its strain temperature avoids causing undesirable distortion defects in the glass. Furthermore, since it is costly to include lithium in a glass as a batch ingredient, and because greater strengthening can generally be achieved, it is desirable that sodium, rather than lithium, be the ion in the glass which is replaced. In that case, the larger ion which enters the glass is most advantageously potassium. Hence, this invention is directed specifically to the improvement of ion exchange strengthening processes which involve replacing sodium with potassium below the strain point of the glass.

Conventional soda-lime-silica flat glass compositions can be strengthened by ion exchange, but the great length of time required to produce a significant compression layer depth is incompatible with many high volume commercial operations. For this reason, special glass compositions have been developed which have greatly enhanced ion exchange properties, chief among which are the $Al_2O_3$ and/or $ZrO_2$ containing glasses disclosed by Mochel in U.S. Pat. Nos. 3,485,702; 3,752,729; and 3,790,430. Variations of these alumina or zirconia containing glasses may be seen in many U.S. patents including the following (some of which contain lithium):

U.S. Pat. No. 3,357,876 — Rinehart
U.S. Pat. No. 3,433,611 — Saunders et al.
U.S. Pat. No. 3,481,726 — Fischer et al.
U.S. Pat. No. 3,485,647 — Harrington
U.S. Pat. No. 3,498,773 — Grubb et al.
U.S. Pat. No. 3,772,135 — Hara et al.
U.S. Pat. No. 3,778,335 — Boyd
U.S. Pat. No. 3,844,754 — Grubb et al.

While these specially adapted ion exchange glass compositions of the prior art greatly reduce the amount of time required for ion exchange treatment compared to conventional soda-lime-silica glass, the commercial use of lithium-free ion exchange glasses remains limited to low volume specialty items because treatment times are still impractically long for many applications. Moreover, many of the prior art compositions have melting temperatures considerably higher than soda-lime-silica glass and thus are not readily adapted for use in existing melting and forming facilities. Thus, it would be highly desirable to have glass compositions available which could be more rapidly strengthened by exchange treatment with potassium and at the same time be possessed of melting temperatures more in line with ordinary soda-lime-silica glass. Other factors such as transparency, chemical durability, and the cost of raw materials also must be taken into consideration.

Substantial progress toward the above-noted goals was attained by the glass compositions disclosed in parent application Serial No. 605,108, the disclosure of which is hereby incorporated by reference. The present invention represents an even greater improvement over those glasses, particularly in regard to the speed with which a deep compression layer can be created in the glasses.

SUMMARY OF THE INVENTION

It has now been found that an alkali-alumina-zirconia-silica ion exchange glass of the type disclosed in parent application Ser. No. 605,108 can be adapted to include $P_2O_5$, the result being a significantly enhanced propensity for exchange with potassium ions. At least ninety percent by weight of the glass consists of $SiO_2$, $Na_2O$, $K_2O$, $Al_2O_3$, $ZrO_2$, $P_2O_5$, $ZnO$, $MgO$ and $TiO_2$, and the glass is essentially lithium-free. By carefully selecting the amounts of these constituents, it has been found possible to obtain the ion exchange advantages and at the same time produce a glass that is very transparent, low temperature melting, and resistant to chemical erosion.

THE DRAWINGS

FIG. 1 is a plot of compression layer depth versus ion exchange treatment time for a preferred example of the present invention and for a commercially available ion exchange glass at two different temperatures;

FIG. 2 is a plot of center tension versus exchange time for two preferred examples of the present invention and a commercially available ion exchange glass; and FIG. 3 is a plot of viscosity versus temperature for a preferred example of the present invention, a commercially available ion exchange glass, a typical float glass composition, and a typical sheet glass composition.

DETAILED DESCRIPTION

In its broadest aspects, the novel glass composition of the present invention includes the following:

| Component | Percent by Weight, Oxide basis |
| --- | --- |
| $SiO_2$ | 34 – 61 |
| $Na_2O$ | 12 – 20 |
| $K_2O$ | 2 – 9 |
| ($Na_2O + K_2O$) | 17 – 23 |
| $Al_2O_3$ | 2 – 15 |
| $ZrO_2$ | 0 – 10 |
| ($Al_2O_3 + ZrO_2$) | 9 – 23 |
| $P_2O_5$ | 2 – 20 |
| ZnO | 0 – 8 |
| MgO | 0 – 6 |
| $TiO_2$ | 0 – 5 |
| (ZnO + MgO + $TiO_2$) | 2 – 9 |

The glass includes no more than trace amounts of $Li_2O$, i.e., no more than about 0.1 percent by weight. The composition may also include small amounts (no more than about 10 percent) of other conventional fluxing ingredients such as BaO, PbO, and $B_2O_3$.

When about 10 percent or more $P_2O_5$ is included in the glass, it is necessary to include at least 2 percent ZnO in the glass. Moreover, it is preferred in that case that the (ZnO + MgO + $TiO_2$) component consist almost entirely of ZnO. Thus, for high phosphate concentrations (10 to 20 percent) the preferred composition is as follows:

| Component | Percent by Weight, Oxide Basis |
| --- | --- |
| $SiO_2$ | 34 – 52 |
| $Na_2O$ | 12 – 20 |
| $K_2O$ | 2 – 9 |
| ($Na_2O + K_2O$) | 20 – 23 |
| $Al_2O_3$ | 8 – 15 |
| $ZrO_2$ | 0 – 9 |
| ($Al_2O_3 + ZrO_2$) | 10 – 23 |
| $P_2O_5$ | 10 – 20 |
| ZnO | 2 – 8 |

At lower $P_2O_5$ levels (2 to 10 percent) ZnO is not an essential ingredient, but in order to obtain practical melting temperatures, the combined amount of ZnO + MgO + $TiO_2$ should fall within the range of about 2 to 9 percent. In that case, the preferred composition may be stated as:

| Component | Percent by Weight, Oxide Basis |
| --- | --- |
| $SiO_2$ | 44 – 61 |
| $Na_2O$ | 12 – 18 |
| $K_2O$ | 3 – 9 |
| ($Na_2O + K_2O$) | 17 – 23 |
| $Al_2O_3$ | 2 – 15 |
| $ZrO_2$ | 2 – 10 |
| ($Al_2O_3 + ZrO_2$) | 9 – 20 |
| $P_2O_5$ | 2 – 10 |
| ZnO | 0 – 5 |
| MgO | 0 – 6 |
| $TiO_2$ | 0 – 5 |
| (ZnO + MgO + $TiO_2$) | 2 – 9 |

$SiO_2$ is the primary glass former and is the largest single component of these glasses. Minimizing the $SiO_2$ content is desirable so as to lower the melting temperature, but too little $SiO_2$ can adversely affect durability of the glass. $Na_2O$ is present as a fluxing agent and provides the sites for subsequent ion exchange. Although an excess of $Na_2O$ can reduce the resistance of the glass to chemical attack, at least the minimum amount prescribed should be present in the glass to maintain the melting temperature of the glass at a practical level and to provide the glass with an appreciable ion exchange propensity. $K_2O$ is also desirably present in the glass as a fluxing agent. At higher concentrations, $K_2O$ can lower the strength obtained by ion exchange with potassium, but it has been found that in small amounts $K_2O$ actually tends to improve exchange of sodium by potassium.

The ingredients primarily responsible for practical below-the-strain-point ion exchange strengthening are $Al_2O_3$ and $ZrO_2$. The inclusion of excess $Al_2O_3$ in this type of glass, however, raises its melting temperature substantially and lowers its chemical durability. $ZrO_2$ does not have these drawbacks, but it has been found that the inclusion of more than a few percent of $ZrO_2$ in these glasses leads to devitrification which can adversely affect forming operations. However, $Al_2O_3$ and a limited amount of $ZrO_2$ tend to make a glass clearer. The aforementioned application Ser. No. 605,108 discloses glass compositions which successfully include both $Al_2O_3$ and $ZrO_2$ in such a way as to avoid the drawbacks of both. Although such glasses are excellent ion exchange glasses and represent major improvements, upper limits on their $Al_2O_3$ and $ZrO_2$ contents acts as restraints on the ion exchange rates obtainable. The inclusion of $P_2O_5$ in the glasses here has been found to extend the ion exchange properties of that type of glass beyond previous limits. In particular, the $P_2O_5$ increases the speed with which a given depth of compression layer can be attained. The $P_2O_5$ also advantageously raises the strain point and has a beneficial effect on the melting temperature, but an excess may adversely affect chemical durability and homogeneity. However, a high degree of chemical durability can be maintained at the upper end of the $P_2O_5$ range (i.e., about 15 to 20 percent) if the glass includes no more than about 13 percent $Al_2O_3$. Furthermore, larger amounts of $P_2O_5$ than necessary are undesirable from a batch cost standpoint.

One or more of ZnO, MgO, and $TiO_2$ are present in the glass to aid melting. However, at a $P_2O_5$ content of about 10 percent or more, the presence of ZnO is essential in order to avoid hazinesses caused by light scattering in the glass. Moreover, at the 10 percent-plus level of $P_2O_5$, only small amounts of MgO or $TiO_2$ (preferably none) should be present if the glass is to be clear.

As discussed above, the glasses of the present invention are intended to be lithium-free. However, trace amounts of $Li_2O$ (up to about 0.1 percent by weight) may be tolerated.

Minor amounts of colorants may be added to the compositions in order to produce tinted glass. Many such colorants are known to those of skill in the art and include, for example: CuO, CoO, $Cr_2O_3$, $Fe_2O_3$, and MnO.

A major object of the present invention is the production of ion exchange glasses which have melting temperatures similar to that of conventional soda-lime-silica glass. Melting temperature, for the purposes of this application, is taken as the temperature at which the glass has a viscosity of 100 poises. Since commerical flat glass made by the float process or the sheet updraw process usually exhibit a viscosity of 100 poises at a temperature below about 2800° F. (1538° C.), that temperature is considered herein as being the upper limit for a desirable melting temperature.

The accompanying examples illustrate the effect each of the constituents has on the properties of the glass, and include examples within as well as outside the scope of the present invention. The example glasses were melted from laboratory batch materials including: "Supersil" sand, zircon sand ($ZrSiO_4$), aluminum metaphosphate, reagent grade ZnO, MgO, $Na_2CO_3$, $K_2CO_3$, and Al(OH)$_3$, and commercial grade $TiO_2$. The following batch composition, for Example 586, is typical:

| Ingredient | Weight (grams) |
|---|---|
| "Supersil" sand | 317.1 |
| Sodium carbonate (anhydrous) | 230.9 |
| Aluminum hydrate [Al(OH)$_3$] | 73.6 |
| Potassium carbonate | 33.1 |
| Zircon sand ($ZrSiO_4$) | 50.8 |
| Aluminum metaphosphate | 143.8 |
| Zinc oxide | 37.5 |

The batch ingredients were added incrementally over a period of approximately 3 hours to a 4 inch (10 centimeter) diameter platinum crucible held at about 1450° C. (higher where required). Each melt was stirred during the batch additions and for an additional period of about 15 hours during which the melt was maintained at 1450° C. Thereafter, each melt was held at 1450° C. for about one more hour in a quiescent state, after which a number of rods were drawn from the melt and the remainder of the melt was cast onto a plate.

The depth of the compression layer and the strength obtained after two different ion exchange treatments in molten $KNO_3$ are reported for many of the examples. Compression layer depth was measured optically on a ground cross-sectional slice sawed from a plate of the ion-exchange glass. Each slice was placed between cross-polaroids under a microscope, where the compression zone could be observed. Strength is reported as modulus of rupture (M.O.R.) obtained by the abraded rod technique. Rods nominally 3 millimeters in diameter drawn from the glass melt were cut into approximately 2.5 inch (6.5 centimeter) lengths and heated at about 650° C. for half an hour, then cooled to room temperature overnight to anneal the rods. After ion exchange treatment, the rods are subjected to tumble abrasion by being placed in a 16 oz. jar containing 240 grit silicon carbide. The jar is rotated horizontally about its main axis at a speed of about 167 revolutions per minute for 30 minutes. Each abraded rod is then placed singly on a 1.5 inch (3.8 centimeter) support span and stressed to fracture with a ⅜ inch (1.9 centimeter) wide load member. The load at fracture is recorded, and M.O.R. is calculated by the following formula:

$$M.O.R. = 8WL/\pi ab^2$$

where W is the load at fracture, L is the difference between the load and support spans, $a$ is the larger diameter of the rod, and $b$ is the smaller diameter of the rod (assuming that the rod is not perfectly circular in cross-section). Each reported M.O.R. value represents the average of at least ten rods.

The annealing points given in the examples were determined by a differential thermal analysis technique. Melting temperature, defined for the purposes of this application as the temperature at which the viscosity of the glass is 100 poises, and forming temperature, defined as the temperature at which the viscosity of the glass is 10,000 poises, were both determined by a standard rotating spindle viscometer technique. Where any of the measurements were duplicated, the values shown in the tables represent averages.

The examples use terms such as "clear," "hazy," and "cloudy" to describe the appearance of the glasses. More precisely, they represent the degree of light scattering observed in each glass by the unaided eye, that is, the sharpness with which an image may be perceived through the glass. Because such a quality is difficult to measure quantitatively, the somewhat subjective terms "clear," "hazy," and "cloudy" are necessarily relied on. "Clear" is intended to mean that the glass appears to be fully transparent (although it may be colored). "Hazy" means that some bluish or whitish irridescence or interference with visibility is detected, particularly at oblique angles, but that images are still at least fairly recognizable through the glass. Glasses which are "cloudy" are difficult to see through and possess a definite whitish cast from all angles. The reported appearances are based on observations of rods and/or plates of each glass with thicknesses of about ⅛ inch (3 millimeters) to about ¼ inch (6 millimeters). It should be noted that the degree of light scattering is independent of light transmittance. Thus, a colored (or "tinted") piece of glass which absorbs a substantial portion of the light striking it may be substantially free from light scattering and would thus be considered "clear".

TABLE I

| EXAMPLE NO.: | 411 | 492 | 493 | 515 | 514 | 501 | 516 | 523 | 534 | 545 |
|---|---|---|---|---|---|---|---|---|---|---|
| COMPOSITION (% by weight): | | | | | | | | | | |
| $SiO_2$ | 54.5 | 52.5 | 49.5 | 47.5 | 46.5 | 44.5 | 52.5 | 39.5 | 36.5 | 34.5 |
| $Na_2O$ | 18.0 | 18.0 | 18.0 | 18.0 | 18.0 | 18.0 | 18.0 | 18.0 | 18.0 | 18.0 |
| $Al_2O_3$ | 10.0 | 10.0 | 10.0 | 10.0 | 10.0 | 10.0 | 10.0 | 10.0 | 10.0 | 10.0 |
| MgO | 5.0 | 5.0 | 5.0 | 5.0 | 5.0 | 5.0 | 5.0 | 5.0 | 5.0 | 5.0 |
| $K_2O$ | 3.0 | 3.0 | 3.0 | 3.0 | 3.0 | 3.0 | 3.0 | 3.0 | 3.0 | 3.0 |
| $ZrO_2$ | 4.5 | 4.5 | 4.5 | 4.5 | 4.5 | 4.5 | 4.5 | 4.5 | 4.5 | 4.5 |
| $P_2O_5$ | — | 2.0 | 5.0 | 7.0 | 8.0 | 10.0 | 12.0 | 15.0 | 18.0 | 20.0 |
| $TiO_2$ | 5.0 | 5.0 | 5.0 | 5.0 | 5.0 | 5.0 | 5.0 | 5.0 | 5.0 | 5.0 |
| APPEARANCE: | Clear | Clear | Clear | Clear | Clear | Clear-slight haze | Hazy | Cloudy | Very Cloudy | Almost Opaque |
| COMPRESSION LAYER DEPTH (microns) | | | | | | | | | | |
| after 1 hr. at 1000° F (538° C): | 54 | 57 | 60 | 70 | 65 | 75 | 85 | 100 | 115 | 130 |
| M.O.R. (Kg/cm$^2$) | | | | | | | | | | |
| after 1 hr. at 1000° F (538° C): | 4700 | 4100 | 3800 | 5000 | 5100 | 5200 | 5400 | 5700 | 5100 | — |
| after 4 hrs. at 900° F (482° C): | 5600 | 5300 | 5400 | 5300 | 5600 | 6000 | 6600 | 6600 | 6100 | — |
| ANNEALING POINT (° C): | 573 | 566 | 550 | 558 | 562 | 582 | 604 | 621 | 621 | 648 |
| MELTING TEMPERATURE (° C): | 1416 | 1417 | 1398 | 1390 | 1379 | 1372 | — | 1342 | 1312 | 1298 |
| FORMING TEMPERATURE (° C): | | 1042 | 1028 | 1019 | 1016 | 1016 | — | 1001 | 991 | 989 |

Table I shows the effect of progressively substituting $P_2O_5$ for $SiO_2$ in a glass of the type disclosed in the parent application, beginning with Example 411, which was a preferred example therein. At 10 percent $P_2O_5$ a slight haze begins to appear in the glass, which increases to an almost opaque white appearance at 20 percent $P_2O_5$. However, in Examples 492, 493, 515, and 514 (and marginally in 501) sufficient $P_2O_5$ was included to significantly increase the compression layer depth attained after a one hour exchange treatment, and yet those glasses were found to be clear. Additionally, those examples exhibit very favorable melting temperatures, due in large measure to the presence of MgO and $TiO_2$.

Variations of the same system, with $P_2O_5$ limited to 10 percent or less, are shown in Table II. As noted, Table II includes glasses which were clear as well as others which were not for the sake of comparison. Example 551 is of particular interest in that, despite the fact that it is a clear glass, it is not a preferred embodiment because of an excessively high melting temperature, due to the absence of MgO and $TiO_2$.

TABLE II

| EXAMPLE NO.: | 526 | 533 | 544 | 550 | 551 | 554 | 555 | 558 | 560 | 565 | 566 |
|---|---|---|---|---|---|---|---|---|---|---|---|
| Composition (% by weight): | | | | | | | | | | | |
| $SiO_2$ | 46.0 | 48.0 | 48.0 | 44.0 | 52.5 | 50.0 | 52.5 | 54.5 | 49.5 | 54.5 | 50.5 |
| $Na_2O$ | 18.0 | 18.0 | 18.0 | 18.0 | 18.0 | 18.0 | 18.0 | 18.0 | 18.0 | 18.0 | 18.0 |
| $Al_2O_3$ | 12.0 | 12.0 | 12.0 | 10.0 | 12.0 | 10.0 | 10.0 | 8.0 | 10.0 | 4.5 | 14.0 |
| MgO | 4.5 | 4.5 | 2.5 | 5.5 | — | 4.5 | 5.0 | 4.5 | 5.0 | 5.5 | 4.5 |
| $K_2O$ | 3.0 | 3.0 | 3.0 | 3.0 | 3.0 | 3.0 | 3.0 | 3.0 | 3.0 | 3.0 | 3.0 |
| $ZrO_2$ | 4.5 | 4.5 | 4.5 | 4.5 | 4.5 | 4.5 | 4.5 | 2.0 | 4.0 | 4.5 | 10.0 |
| $P_2O_5$ | 10.0 | 10.0 | 10.0 | 10.0 | 10.0 | 10.0 | 7.0 | 10.0 | 10.0 | 10.0 | 1.0 |
| $TiO_2$ | 2.0 | — | 2.0 | 5.0 | — | — | — | — | — | — | — |
| Appearance: | Clear-Smoky | Clear | Clear | Hazy | Clear | Clear Slight Haze | Clear | Clear Slight Haze | Clear | Clear | Hazy |
| Compression Layer Depth (microns) | | | | | | | | | | | |
| after 1 hr. at 1000° F (538° C): | | 90 | 95 | | | | 90 | 90 | 90 | | |
| M.O.R. (kg/cm²) | | | | | | | | | | | |
| after 1 hr. at 1000° F (538° C): | 5800 | 5800 | 5600 | — | 3700 | 4300 | 4400 | 2400 | 4300 | 2500 | |
| after 4 hrs. at 900° F (482° C): | 6000 | 5800 | 5600 | 4900 | 4700 | 5500 | 5200 | 3900 | 5800 | 3800 | 5400 |
| Annealing Point (° C): | | 617 | 625 | | | 598 | 571 | | 589 | 566 | |
| Melting Temperature (° C): | | 1474 | | | 1543 | 1468 | 1471 | 1487 | | 1422 | |
| Forming Temperature (° C): | | 1091 | | | 1119 | 1081 | 1079 | 1073 | | 1029 | |
| EXAMPLE NO.: | 666 | 711 | 721 | 723 | 724 | 745 | 753 | 754 | 792 | 795 | 813 | 814 |
| Composition (% by weight): | | | | | | | | | | | | |
| $SiO_2$ | 59.0 | 44.5 | 47.5 | 51.5 | 50.5 | 47.5 | 47.5 | 45.5 | 44.5 | 54.5 | 56.0 | 61.0 |
| $Na_2O$ | 18.0 | 18.0 | 12.0 | 18.0 | 18.0 | 18.0 | 18.0 | 18.0 | 18.0 | 18.0 | 16.0 | 17.0 |
| $Al_2O_3$ | 10.0 | 15.0 | 12.0 | 10.0 | 10.0 | 10.0 | 12.0 | 14.0 | 14.0 | 10.0 | 2.0 | 4.5 |
| MgO | — | 5.0 | 5.0 | 5.0 | 5.0 | 5.0 | 5.0 | 5.0 | 5.0 | 5.0 | 5.0 | 5.0 |
| $K_2O$ | 3.0 | 3.0 | 9.0 | 3.0 | 3.0 | 3.0 | 3.0 | 3.0 | 3.0 | 3.0 | 3.0 | — |
| $ZrO_2$ | — | 4.5 | 4.5 | 4.5 | 4.5 | 4.5 | 4.5 | 4.5 | 5.5 | 4.5 | 10.0 | 4.5 |
| $P_2O_5$ | 10.0 | 10.0 | 10.0 | 8.0 | 9.0 | 10.0 | 10.0 | 10.0 | 9.0 | 5.0 | 8.0 | 8.0 |
| $TiO_2$ | | | | | | 2.0 | | | | 0.5 | | |
| Appearance: | Hazy | Clear Smoky | Clear Smoky | Clear Smoky | Clear | Clear Slight Haze | Clear | Clear Slight Haze | Clear | Clear | Clear | Clear |
| Compression Layer Depth (microns) | | | | | | | | | | | | |
| after 1 hr. at 1000° F (538° C): | 120 | | | | | | | | | | | |
| M.O.R. (kg/cm²) | | | | | | | | | | | | |
| after 1 hr. at 1000° F (538° C): | | 6900 | | 4500 | 4600 | | 6300 | | | | 3300 | — |
| after 4 hrs. at 900° F (482° C): | | 8200 | | 6000 | 6000 | | 6500 | | | | 4600 | 3500 |
| Annealing Point (° C): | 541 | | | | | | | | | | | |
| Melting Temperature (° C): | 1574 | | | | 1474 | | | | | | 1462 | 1537 |
| Forming Temperature (° C): | 1024 | | | | 1085 | | | | | | 1098 | 1114 |

Table III sets forth numerous attempts to produce a clear ion exchange glass containing more than 10 percent $P_2O_5$. ZnO was not present, and apparently as a result, none of the attempts successfully produced a clear glass.

TABLE III

| EXAMPLE NO.: | 527 | 536 | 557 | 608 | 612 | 649 | 657 | 662 | 671 |
|---|---|---|---|---|---|---|---|---|---|
| COMPOSITION (% by weight) | | | | | | | | | |
| $SiO_2$ | 44.5 | 41.5 | 46.5 | 50.0 | 44.5 | 49.5 | 44.5 | 54.0 | 48.0 |
| $Na_2O$ | 18.0 | 18.0 | 18.0 | 18.0 | 18.0 | 18.0 | 18.0 | 18.0 | 18.0 |
| $Al_2O_3$ | 10.0 | 10.0 | 10.0 | 4.5 | 10.0 | 10.0 | 15.0 | 10.0 | 10.0 |
| MgO | | 5.0 | | 5.0 | 5.0 | | | | |
| $K_2O$ | 3.0 | 3.0 | 3.0 | 3.0 | 3.0 | 3.0 | 3.0 | 3.0 | 3.0 |
| $ZrO_2$ | 4.5 | 4.5 | 4.5 | 4.5 | 4.5 | 4.5 | 4.5 | | 6.0 |
| $P_2O_5$ | 15.0 | 18.0 | 18.0 | 15.0 | 15.0 | 15.0 | 15.0 | 15.0 | 15.0 |
| $TiO_2$ | 5.0 | | | | | | | | |
| APPEARANCE: | Cloudy | Cloudy | Hazy | Cloudy | Cloudy | Hazy | Slight haze | Hazy | Cloudy |
| COMPRESSION LAYER DEPTH (microns) | | | | | | | | | |
| after 1 hr. at 1000° F (538° C) | 115 | 135 | 130 | | 125 | 130 | 170 | 125 | |
| M.O.R. (kg/cm²) | | | | | | | | | |
| after 1 hr. at 1000° F (538° C): | 3900 | 5300 | | 4400 | 5500 | | | | |
| after 4 hrs. at 900° F (482° C): | | 6100 | | 5300 | 6100 | | 5300 | | |
| ANNEALING POINT (° C): | | 688 | 670 | | | 642 | | 614 | |
| MELTING TEMPERATURE (° C): | | 1411 | 1519 | | | | 1536 | 1568 | |
| FORMING TEMPERATURE (° C): | | 1069 | 1123 | | | | 1121 | 1125 | |
| EXAMPLE NO.: | 673 | 674 | 675 | 676 | 677 | 687 | 722 | 755 | |
| COMPOSITION (% by weight): | | | | | | | | | |
| $SiO_2$ | 47.5 | 46.0 | 49.0 | 42.5 | 40.5 | 47.0 | 42.5 | 39.5 | |
| $Na_2O$ | 18.0 | 18.0 | 18.0 | 18.0 | 18.0 | 18.0 | 18.0 | 18.0 | |
| $Al_2O_3$ | 12.0 | 10.0 | 15.0 | 10.0 | 10.0 | 10.0 | 10.0 | 15.0 | |

TABLE III-continued

| | | | | | | | | | |
|---|---|---|---|---|---|---|---|---|---|
| MgO | | | | 7.0 | 9.0 | | 5.0 | 5.0 | |
| $K_2O$ | 3.0 | 3.0 | 3.0 | 3.0 | 3.0 | 3.0 | 3.0 | 3.0 | |
| $ZrO_2$ | 4.5 | 8.0 | | 4.5 | 4.5 | 7.0 | 4.5 | 4.5 | |
| $P_2O_5$ | 15.0 | 15.0 | 15.0 | 15.0 | 15.0 | 15.0 | 15.0 | 15.0 | |
| $TiO_2$ | | | | | | | 2.0 | | |
| APPEARANCE: | Hazy | Slightly Hazy | Hazy | Cloudy | Cloudy | Hazy | Cloudy | Cloudy | |
| COMPRESSION LAYER DEPTH (microns) after 1 hr. at 1000° F (538° C): | | | | | | | | | |
| M.O.R. (kg/cm²) after 1 hr. at 1000° F (538° C): | | 5200 | | | | | 5700 | | |
| after 4 hrs. at 900° F (482° C): | | 5500 | | | | | 6000 | | |
| ANNEALING POINT (° C): | | | | | | | | | |
| MELTING TEMPERATURE (° C): | 1546 | | 1593 | | | | | | |
| FORMING TEMPERATURE (° C): | 1130 | | 1135 | | | | | | |

In Table IV the effect of ZnO on clarity in $P_2O_5$-containing ion exchange glasses is demonstrated. Not only did the ZnO enable clarity to be maintained at $P_2O_5$ levels as high as 20 percent, but also, as seen in the examples, the melting temperature in most cases was held below 1550° C. The degree of success varied, however, as can be seen in the data. One exceptional, unexplained problem was encountered in Examples 658, 688, and 689. There, despite initial clarity, the glasses developed chalky, white deposits on portions of some of the samples several weeks after being made.

TABLE IV

| EXAMPLE NO.: | 586 | 642 | 643 | 645 | 646 | 647 | 648 | 650 | 651 | 652 | 653 |
|---|---|---|---|---|---|---|---|---|---|---|---|
| Composition (% by weight): | | | | | | | | | | | |
| $SiO_2$ | 44.5 | 45.5 | 46.5 | 44.5 | 43.5 | 43.5 | 43.5 | 42.5 | 47.5 | 45.5 | 43.5 |
| $Na_2O$ | 18.0 | 17.0 | 18.0 | 10.0 | 18.0 | 17.0 | 17.0 | 18.0 | 18.0 | 18.0 | 18.0 |
| $Al_2O_3$ | 10.0 | 10.0 | 8.0 | 10.0 | 10.0 | 10.0 | 10.0 | 12.0 | 10.0 | 10.0 | 8.0 |
| MgO | | | | | | 2.0 | | | | | |
| $K_2O$ | 3.0 | 3.0 | 3.0 | 11.0 | 2.0 | 3.0 | 3.0 | 3.0 | 3.0 | 3.0 | 3.0 |
| $ZrO_2$ | 4.5 | 4.5 | 4.5 | 4.5 | 4.5 | 4.5 | 4.5 | 4.5 | 4.5 | 4.5 | 4.5 |
| $P_2O_5$ | 15.0 | 15.0 | 15.0 | 15.0 | 15.0 | 15.0 | 15.0 | 15.0 | 15.0 | 15.0 | 15.0 |
| ZnO | 5.0 | 5.0 | 5.0 | 5.0 | 7.0 | 5.0 | 7.0 | 5.0 | 2.0 | 4.0 | 8.0 |
| Appearance: | Clear | Clear | Hazy | Hazy | Clear | Hazy | Clear | Clear | Hazy | Hazy | Clear |
| Compression Layer Depth (microns) after 1 hr at 1000° F (538° C): | 135 | 125 | 115 | 150 | | | 120 | 145 | 130 | 135 | |
| M.O.R. (kg/cm²) after 1 hr. at 1000° F (538° C): | 4800 | 5100 | 5000 | | 4800 | | 5100 | 5400 | | | |
| after 4 hrs. at 900° F (482° C): | 5600 | | | | | | 6100 | 6300 | | | 5000 |
| Annealing Point (° C): | 674 | | | | | | | | | | |
| Melting Temperature (° C): | 1466 | | 1404 | | 1423 | | | | | | |
| Forming Temperature (° C): | 1082 | | | | | | | | | | |

| EXAMPLE NO.: | 654 | 655 | 656 | 658 | 659 | 660 | 664 | 678 | 686 | 688 | 689 |
|---|---|---|---|---|---|---|---|---|---|---|---|
| Composition (% by weight): | | | | | | | | | | | |
| $SiO_2$ | 45.0 | 45.0 | 45.0 | 49.0 | 44.5 | 39.5 | 36.5 | 46.0 | 42.5 | 48.0 | 47.0 |
| $Na_2O$ | 18.0 | 18.0 | 18.0 | 18.0 | 18.0 | 18.0 | 18.0 | 18.0 | 18.0 | 18.0 | 18.0 |
| $Al_2O_3$ | 10.0 | 8.0 | 12.0 | 10.0 | 8.0 | 10.0 | 10.0 | 10.0 | 10.0 | 10.0 | 10.0 |
| $K_2O$ | 3.0 | 3.0 | 3.0 | 3.0 | 3.0 | 3.0 | 3.0 | 3.0 | 3.0 | 3.0 | 3.0 |
| $ZrO_2$ | 4.5 | 4.5 | 4.5 | — | 6.5 | 4.5 | 4.5 | — | 4.5 | — | |
| $P_2O_5$ | 15.0 | 15.0 | 15.0 | 15.0 | 15.0 | 20.0 | 20.0 | 15.0 | 15.0 | 15.0 | 15.0 |
| ZnO | 4.5 | 6.5 | 2.5 | 5.0 | 5.0 | 5.0 | 8.0 | 8.0 | 7.0 | 6.0 | 7.0 |
| Appearance: | Clear | Clear | Clear | Clear* | Hazy | Hazy | Hazy | slightly Hazy | Clear | Cloudy* | Clear* |
| Compression Layer Depth (microns) after 1 hr at 100° F (538° C): | 140 | 115 | 140 | 145 | 130 | 180 | | | | | |
| M.O.R. (kg/cm²) after 1 hr. at 1000° F (538° C): | | | 5000 | | | | | | | | 4600 |
| after 4 hrs. at 900° F (482° C): | | | 5700 | 4700 | | 5000 | | | | | |
| Melting Temperature (° C): | | | 1524 | | | | | | | | |
| Forming Temperature (° C): | | | 1118 | | | | | | | | |

| EXAMPLE NO.: | 690 | 692 | 693 | 694 | 705 | 706 | 712 | 713 | 714 | 719 | 720 |
|---|---|---|---|---|---|---|---|---|---|---|---|
| Composition (% by weight): | | | | | | | | | | | |
| $SiO_2$ | 49.5 | 47.5 | 44.5 | 39.5 | 43.0 | 51.5 | 52.5 | 39.5 | 40.5 | 45.5 | 42.5 |
| $Na_2O$ | 18.0 | 18.0 | 16.0 | 18.0 | 18.0 | 18.0 | 12.0 | 12.0 | 12.0 | 14.0 | 14.0 |
| $Al_2O_3$ | 10.0 | 10.0 | 10.0 | 15.0 | 10.0 | 10.0 | 12.0 | 15.0 | 12.0 | 12.0 | 12.0 |
| $K_2O$ | 3.0 | 3.0 | 3.0 | 3.0 | 3.0 | 3.0 | 9.0 | 9.0 | 9.0 | 9.0 | 7.0 |
| $ZrO_2$ | 4.5 | 4.5 | 4.5 | 4.5 | 6.0 | 4.5 | 4.5 | 4.5 | 4.5 | 4.5 | 4.5 |
| $P_2O_5$ | 10.0 | 12.5 | 15.0 | 15.0 | 15.0 | 8.0 | 15.0 | 15.0 | 15.0 | 10.0 | 15.0 |
| ZnO | 5.0 | 5.0 | 5.0 | 5.0 | 5.0 | 5.0 | 5.0 | 5.0 | 7.0 | 5.0 | 5.0 |
| $TiO_2$ | | | 2.0 | | | | | | | | |
| Appearance: | Clear | Clear | Hazy | Clear | Clear | Clear | Clear | Clear | Clear | Clear | Clear |
| Compression Layer Depth (microns) after 1 hr. at 1000° F (538° C): | 100 | 105 | | 150 | | 90 | 195 | 185 | 160 | | |
| after 4 hrs. at 900° F (482° C): | 90 | 105 | | | | 90 | 235 | 215 | 205 | | |
| M.O.R. (kg/cm²) after 1 hr. at 1000° F (538° C): | 4300 | 4700 | | 4600 | 4900 | 4300 | 4400 | | | 4400 | |
| after 4 hrs. at 900° F (482° C): | 5100 | 5400 | | 6500 | 5800 | 5900 | 4000 | | | 5300 | 5200 |

| EXAMPLE NO.: | 725 | 729 | 730 | 733 | 735 | 736 | 737 | 738 | 739 | 742 | 743 |
|---|---|---|---|---|---|---|---|---|---|---|---|
| Composition (% by weight): | | | | | | | | | | | |
| $SiO_2$ | 47.5 | 42.5 | 44.5 | 40.5 | 42.5 | 39.0 | 37.0 | 46.5 | 39.0 | 44.5 | 40.5 |
| $Na_2O$ | 12.0 | 18.0 | 16.0 | 14.0 | 14.0 | 14.0 | 14.0 | 14.0 | 14.0 | 12.0 | 12.0 |
| $Al_2O_3$ | 12.0 | 10.0 | 10.0 | 14.0 | 10.0 | 14.0 | 14.0 | 12.0 | 15.0 | 10.0 | 14.0 |
| $K_2O$ | 9.0 | 3.0 | 5.0 | 7.0 | 7.0 | 7.0 | 7.0 | 7.0 | 7.0 | 9.0 | 9.0 |
| $ZrO_2$ | 4.5 | 4.5 | 4.5 | 4.5 | 4.5 | 6.0 | 6.0 | 4.5 | 6.0 | 4.5 | 4.5 |
| $P_2O_5$ | 10.0 | 15.0 | 15.0 | 15.0 | 15.0 | 15.0 | 15.0 | 11.0 | 15.0 | 15.0 | 15.0 |
| ZnO | 5.0 | 5.0 | 5.0 | 5.0 | 7.0 | 5.0 | 7.0 | 5.0 | 4.0 | 5.0 | 5.0 |
| $TiO_2$ | | 2.0 | | | | | | | | | |
| Appearance: | Clear | Cloudy | Clear | Clear | Clear | Clear | Clear | Clear | Clear | Hazy | Clear |

TABLE IV-continued

| M.O.R. (kg/cm²) | | | | | | | | | | | |
|---|---|---|---|---|---|---|---|---|---|---|---|
| after 1 hr. at 1000° F (538° C): | 4000 | | | | | 6000 | — | 5800 | | 5200 | |
| after 4 hrs. at 900° F (482° C): | 4300 | | 6000 | | | 5600 | 5400 | 6400 | | — | |
| EXAMPLE NO.: | 756 | 757 | 761 | 781 | 783 | 793 | 796 | 803 | 812 | 815 | 819 |
| Composition (% by weight): | | | | | | | | | | | |
| $SiO_2$ | 44.5 | 36.5 | 34.5 | 37.1 | 38.5 | 44.5 | 54.5 | 40.5 | 45.5 | 59.0 | 49.5 |
| $Na_2O$ | 18.0 | 18.0 | 18.0 | 17.4 | 18.0 | 18.0 | 18.0 | 18.0 | 20.0 | 16.0 | 13.0 |
| $Al_2O_3$ | 12.0 | 18.0 | 15.0 | 17.0 | 14.0 | 4.5 | 10.0 | 10.0 | 10.0 | 4.5 | 10.0 |
| MgO | 2.0 | — | — | 1.9 | 2.0 | | | | | | |
| $K_2O$ | 3.0 | 3.0 | 3.0 | 2.9 | 3.0 | 3.0 | 3.0 | 3.0 | — | — | 3.0 |
| $ZrO_2$ | 4.5 | 4.5 | 4.5 | 4.3 | 4.5 | 10.0 | 4.5 | 8.5 | 4.5 | 4.5 | 4.5 |
| $P_2O_5$ | 12.0 | 15.0 | 20.0 | 14.5 | 15.0 | 15.0 | 5.0 | 15.0 | 15.0 | 11.0 | 15.0 |
| ZnO | 4.0 | 5.0 | 5.0 | 4.8 | 5.0 | 5.0 | 5.0 | 5.0 | 5.0 | 5.0 | 5.0 |
| Appearance: | Clear | Clear | Clear | Clear | Hazy | Hazy | Clear | Clear | Clear | Slight Haze | Hazy |
| M.O.R. (kg/cm²) | | | | | | | | | | | |
| after 1 hr. at 1000° F (538° C): | 5500 | 5500 | 6500 | 6800 | 5900 | | 3000 | 6000 | | — | |
| after 4 hrs. at 900° F (482° C): | 6300 | 6800 | 5700 | 7000 | — | | 4500 | 6600 | 5100 | 2300 | |

*White deposits on surface

Table V shows examples of clear, colored glasses within the scope of the present invention.

TABLE V

| Example No.: | 772 | 773 | 774 | 776 | 777 | 787 |
|---|---|---|---|---|---|---|
| Composition (% by weight): | | | | | | |
| $SiO_2$ | 44.2 | 44.45 | 44.2 | 44.0 | 44.0 | 43.5 |
| $Na_2O$ | 18.0 | 18.0 | 18.0 | 18.0 | 18.0 | 18.0 |
| $Al_2O_3$ | 10.0 | 10.0 | 10.0 | 10.0 | 10.0 | 10.0 |
| $MnO_2$ | | | | 0.5 | | |
| $K_2O$ | 3.0 | 3.0 | 3.0 | 3.0 | 3.0 | 3.0 |
| $ZrO_2$ | 4.5 | 4.5 | 4.5 | 4.5 | 4.5 | 4.5 |
| $P_2O_5$ | 15.0 | 15.0 | 15.0 | 15.0 | 15.0 | 15.0 |
| ZnO | 5.0 | 5.0 | 5.0 | 5.0 | 5.0 | 5.0 |
| CuO | 0.3 | | | | | |
| CoO | | 0.05 | | | | |
| $Cr_2O_3$ | | | 0.3 | | | |
| $Fe_2O_3$ | | | | | 0.5 | 1.0 |
| Appearance: | Clear Blue | Clear Blue | Clear Green | Clear Purple | Clear Green | Clear Green |
| M.O.R. (kg/cm²) | | | | | | |
| after 1 hr. at 1000° F (538° C): | 5100 | 4600 | 4700 | | | |
| after 4 hrs. at 900° F (482° C): | 6300 | 6300 | 6300 | | | |

Which of these examples may be considered the most preferred depends upon the particular application for which the glass is intended and the importance placed upon each of the various parameters. One very clear composition which combines a number of desirable properties and appears to be suitable for conventional flat glass applications is Example No. 586. The relative merits of such a composition may be seen by comparing it with a standard, commercially available ion exchange glass sold by Corning Glass Works under the name "Chemcor."

| COMPOSITION | EXAMPLE 586 | COMMERCIAL ION-EXCHANGE GLASS |
|---|---|---|
| $SiO_2$ | 44.5 | 61.91 |
| $Na_2O$ | 18.0 | 12.58 |
| $K_2O$ | 3.0 | 3.45 |
| $Al_2O_3$ | 10.0 | 17.43 |
| $ZrO_2$ | 4.5 | 0.02 |
| $P_2O_5$ | 15.0 | — |
| ZnO | 5.0 | — |
| CaO | — | 0.15 |
| MgO | — | 3.46 |
| $TiO_2$ | — | 0.63 |
| Melting temp., ° C.: | 1466 | 1750 (estimated) |
| Annealing point, ° C.: | 674 | 627 |
| M.O.R. (kg/cm²) | | |
| ($KNO_3$, 4 hrs. 482° C.): | 4800 | 4300 |
| ($KNO_3$, 4 hrs. 482° C.): | 5600 | 6600 |

The melting temperature of the commercial ion exchange glass could not be measured directly, but was estimated by extrapolating obtainable viscosity data.

Additional differences between Example 586 and the commercial ion exchange glass are illustrated in the drawings. In FIG. 1, the compression layer depth attained after treatment in molten $KNO_3$ at two temperatures is plotted against time for both glasses. It is readily apparent that the 586 glass develops a compression layer at a much faster rate than the commercial glass.

FIG. 2 compares the center tension developed in the glasses in terms of optical retardation as measured by the quartz wedge technique. All the glasses were tested on 0.084 inch (6 millimeter) thick samples exchanged for one hour at 1000° F. (538° C.) in molten $KNO_3$. Center tension is a measure of the stresses created in the interior of the glass in counteraction to the compression stresses in the surface portions, and is directly related to the ability of the treated glass to fragment into small particles upon fracture. The plots in the figure show that the Example 586 glass also has a significantly more rapid buildup of center tension than the commercial ion exchange glass. FIG. 2 also includes a plot for the glass of Example 694, another embodiment, and it is shown to be even faster in developing center tension.

FIG. 3, shows temperature-viscosity curves for Example 586 and the commercial ion exchange glass as well as for ordinary float glass and sheet glass. The float glass and sheet glass have the following compositions (percent by weight, oxide basis):

| | Float Glass | Sheet Glass |
|---|---|---|
| $SiO_2$ | 73.2% | 73.0% |
| $Na_2O$ | 13.7 | 13.3 |
| $K_2O$ | 0.03 | 0.2 |
| CaO | 8.9 | 8.2 |
| MgO | 3.9 | 3.7 |
| $Al_2O_3$ | 0.1 | 1.2 |
| $SO_3$ | 0.2 | 0.2 |
| $Fe_2O_3$ | 0.1 | 0.1 |

The plot for glass 586 advantageously lies very close to the plots for sheet and float glass, but in contrast it is readily apparent from the figure that the commercial ion exchange glass is much more difficult to melt than sheet or float glass.

The advantages of rapid compression layer development are considerable. Strength of a particular treated glass as measured by M.O.R. values is by itself seldom sufficient to indicate that a glass article will actually have significantly improved strength when put into service. This is because a high degree of compression can sometimes be concentrated in a very thin layer near the surface of the glass, which, when abraded or scratched in use, can lose its strengthening effect. Therefore, the most demanding requirement for many applications is the need to generate a compression layer deep enough to withstand the physical abuses to which the surface of the glass may be subjected. In this light, it is interesting to compare the treatment times required to obtain a given compression layer thickness as follows:

| Glass | Compression Layer Thickness | Treatment In KNO$_3$ | Abraded Rod M.O.R. |
| --- | --- | --- | --- |
| Example 586 | 150 microns | 1.2 hrs. at 538° C | 4800 kg/cm$^2$ |
| Example 586 | 150 microns | 2 hrs. at 510° C | 5500 kg/cm$^2$ |
| Commercial I-X | 150 microns | 7.3 hrs. at 538° C | 5000 kg/cm$^2$ |
| Commercial I-X | 150 microns | 9.6 hrs. at 510° C | 5800 kg/cm$^2$ |

It can be seen that for a fixed compression layer depth, M.O.R. values for the Example 586 glass were almost the same as for the commercial ion exchange glass, yet the compression layer in 586 was developed in a fraction of the time required by the commercial glass. The minimum compression layer depth required will depend upon the particular end use of the glass, but theoretically the compression layer need extend only beyond the deepest penetration of surface defects in order for the glass to be strengthened. This has been estimated to be about five microns in the case of a glass plate subjected to reasonably careful handling.

It should be apparent that the increase in glass strength attained by ion exchange will vary by degree, ranging from a de minimis effect to a many-fold increase. For many applications, however, it is preferred that the strengthening be at least as great as that achieved by thermal tempering of glass. Thermal usually at least doubles the M.O.R. of float glass, or increases the M.O.R. to a value in the area of about 1700 kg/cm$^2$ or more. The degree to which glass strength may be enhanced by ion exchange is illustrated in the following comparison of abraded rod M.O.R. values:

| | No Ion Exchange | After Ion Exchange in KNO$_3$ | |
| --- | --- | --- | --- |
| | | 1 hr. 538° C | 4 hrs. 493° C |
| Example 586: | 550 kg/cm$^2$ | 4800 kg/cm$^2$ | 5600 kg/cm$^2$ |
| Float glass: | 460 kg/cm$^2$ | 690 kg/cm$^2$ | 820 kg/cm$^2$ |

The chemical durability of the glasses of Example 586 was compared with that of commercial float glass having the composition set forth above. The tests were run on glass discs about 2.5 inches (6.35 centimeters) in diameter formed by casting the glass onto a plate. Without being ion exchanged, the discs were immersed in boiling 2 percent by weight sulfuric acid for 30 minutes, after which they were removed from the acid and measured for weight loss. Other discs were subjected to boiling 0.1 Normal NaOH for 30 minutes, with the following results:

| | Example 586 | Float Glass |
| --- | --- | --- |
| Weight loss in acid (milligrams/cm$^2$) | 0.003 | 0.002 |
| Weight loss in alkali (milligrams/cm$^2$) | 0.004 | 0.043 |

These results show the novel compositions to have chemical durability comparable to, or even better than, float glass, rendering them suitable for use in a wide variety of applications.

Radiant energy transmittance of Example 586 may be compared with float glass as follows for ¼ inch (6 millimeter) thickness:

| | Example 586 | Float Glass |
| --- | --- | --- |
| Luminous | 90.1% | 89% |
| Ultraviolet | 67.1% | 70% |
| Infrared | 88.9% | 68% |
| Total Solar Energy | 88.8% | 78% |
| Dominant wavelength | 574 mµ | 499 mµ |

The details of the process which the ion exchange treatment is carried out are well known in the art and need not be elaborated upon in great length here. In general, it can be said that the type of ion exchange treatment to which this invention pertains is limited to temperatures below the strain point of the glass, but it should be understood that temperatures at, or slightly above, the strain point are permissible as long as the glass does not remain at such a temperature for sufficient length of time to cause appreciable relaxation of the induced compression at the surface of the glass. In other words, the exchange bath temperature may be slightly above the strain point if the treatment time is short. It is preferred that the highest temperature possible be used in order to shorten treatment time; in other cases it is desirable to ion-exchange more slowly to obtain greater strength. Typically, temperatures on the order of 400° to 600° C. are employed. In addition to KNO$_3$, other molten salts of potassium may constitute the exchange bath, such as the chloride, fluoride, or phosphate salts. Other methods of contacting the glass with the exchange medium besids immersing in a molten salt bath have been proposed. These include spraying and coating with a carrier, which may be adaptable to the ion exchange treatment of the glass compositions disclosed herein.

Other modifications and variations as are known in the art may be resorted to without departing from the spirit and scope of the invention as defined by the appended claims.

I claim:
1. A glass essentially transparent to visible light and capable of being strengthened by ion exchange with potassium ions, comprising by weight on the oxide basis:

34 to 61 percent SiO$_2$
12 to 20 percent Na$_2$O
2 to 9 percent K$_2$O
17 to 23 percent (Na$_2$O + K$_2$O)
2 to 15 percent Al$_2$O$_3$
0 to 10 percent ZrO$_2$
9 to 23 percent (Al$_2$O$_3$ + ZrO$_2$)
2 to 20 percent P$_2$O$_5$
0 to 8 percent ZnO
0 to 6 percent MgO
0 to 5 percent TiO$_2$
2 to 9 percent (ZnO + MgO + TiO$_2$)
0 to 0.1 percent Li$_2$O wherein said constituents comprise at least 90 percent by weight of the glass and are proportioned relative to one another so as to provide the glass with a viscosity of 100 poises at a temperature less than 2800° F. (1538° C.)

2. The glass of claim 1 wherein the composition comprises by weight on the oxide basis:
  44 to 61 percent $SiO_2$
  12 to 18 percent $Na_2O$
  3 to 9 percent $K_2O$
  17 to 23 percent ($Na_2O + K_2$)
  2 to 15 percent $Al_2O_3$
  2 to 10 percent $ZrO_2$
  9 to 20 percent ($Al_2O_3 + ZrO_2$)
  2 to 10 percent $P_2O_5$
  0 to 5 percent ZnO
  0 to 6 percent MgO
  0 to 5 percent $TiO_2$
  2 to 9 percent ($ZnO + MgO + TiO_2$)

3. The glass of claim 1 wherein the composition consists essentially of by weight on the oxide basis:
  34 to 52 percent $SiO_2$
  12 to 20 percent $Na_2O$
  2 to 9 percent $K_2O$
  20 to 23 percent ($Na_2O + K_2O$)
  8 to 15 percent $Al_2O_3$
  0 to 9 percent $ZrO_2$
  10 to 23 percent ($Al_2O_3 + ZrO_2$)
  10 to 20 percent $P_2O_5$
  2 to 8 percent ZnO 4. A chemically strengthened transparent glass article exhibiting a surface compressive stress after being subjected to surface abrasion composed of an interior portion which is in tension and a surface compressive layer, said interior portion comprised of by weight on the oxide basis:
  34 to 61 percent $SiO_2$
  12 to 20 percent $Na_2O$
  2 to 9 percent $K_2O$
  17 to 23 percent ($Na_2O + K_2O$)
  2 to 15 percent $Al_2O_3$
  0 to 10 percent $ZrO_2$
  9 to 23 percent ($Al_2O_3 + ZrO_2$)
  2 to 20 percent $P_2O_5$
  0 to 8 percent ZnO
  0 to 6 percent MgO
  0 to 5 percent $TiO_2$
  2 to 9 percent ($ZnO + MgO + TiO_2$)
  0 to 0.1 percent $Li_2O$
said constituents comprising at least 90 percent by weight of the interior portion and proportioned relative to one another so as to provide a glass having a viscosity of 100 poises at a temperature less than 2800° F. (1538° C.), said surface compressive layer having a higher content of $K_2O$ and a lower content of $Na_2O$ than the interior portion.

5. The glass article of claim 4 wherein said interior portion is comprised of by weight on the oxide basis:
  44 to 61 percent $SiO_2$
  12 to 18 percent $Na_2O$
  3 to 9 percent $K_2O$
  17 to 23 percent ($Na_2O + K_2O$)
  2 to 15 percent $Al_2O_3$
  2 to 10 percent $ZrO_2$
  9 to 20 percent ($Al_2O_3 + ZrO_2$)
  2 to 10 percent $P_2O_5$
  0 to 5 percent ZnO
  0 to 6 percent MgO
  0 to 5 percent $TiO_2$
  2 to 9 percent ($ZnO + MgO + TiO_2$).

6. The glass article of claim 4 wherein said interior portion consists essentially of by weight on the oxide basis:
  34 to 52 percent $SiO_2$
  12 to 20 percent $Na_2O$
  2 to 9 percent $K_2O$
  20 to 23 percent ($Na_2O + K_2O$)
  8 to 15 percent $Al_2O_3$
  0 to 9 percent $ZrO_2$
  10 to 23 percent ($Al_2O_3 + ZrO_2$)
  10 to 20 percent $P_2O_5$
  2 to 8 percent ZnO.

7. The glass article of claim 4 wherein said surface compressive layer is at least 50 microns thick.

8. The glass article of claim 4 wherein the surface compressive layer is at least 100 microns thick.

9. The glass article of claim 4 wherein its strength, as measured by abraded rod modulus of rupture, is at least 1700 kilograms per square centimeter.

10. A method of strengthening a transparent glass article comprising the steps of:
  a. contacting a source of potassium ions with the surface of a glass article comprising by weight on the oxide basis:
    34 to 61 percent $SiO_2$
    12 to 20 percent $Na_2O$
    2 to 9 percent $K_2O$
    17 to 23 percent ($Na_2O + K_2O$)
    2 to 15 percent $Al_2O_3$
    0 to 10 percent $ZrO_2$
    9 to 23 percent ($Al_2O_3 + ZrO_2$)
    2 to 20 percent $P_2O_5$
    0 to 8 percent ZnO
    0 to 6 percent MgO
    0 to 5 percent $TiO_2$
    2 to 9 percent ($ZnO + MgO + TiO_2$)
    0 to 0.1 percent $Li_2O$
  said constituents comprising at least 90 percent by weight of the glass article and proportioned relative to one another so as to provide a glass having a viscosity of 100 poises at a temperature less than 2800° F. (1538° C.);
  b. heating said source of potassium ions while in contact with the glass to a temperature at which potassium ions from said source replace sodium ions in the glass, but essentially below the strain point of the glass, thereby creating a zone of compression at the surface of the glass which extends at least 5 microns into the glass; and
  c. removing the glass from contact with the potassium ion source.

11. The method of claim 10 wherein the glass article being strengthened initially comprises by weight on the oxide basis:
  44 to 61 percent $SiO_2$
  12 to 18 percent $Na_2O$
  3 to 9 percent $K_2O$
  17 to 23 percent ($Na_2O + K_2O$)
  2 to 15 percent $Al_2O_3$
  2 to 10 percent $ZrO_2$
  9 to 20 percent ($Al_2O_3 + ZrO_2$)
  2 to 10 percent $P_2O_5$
  0 to 5 percent ZnO
  0 to 6 percent MgO
  0 to 5 percent $TiO_2$
  2 to 9 percent ($ZnO + MgO + TiO_2$)
  0 to 0.1 percent $Li_2O$ said constituents comprising at least 90 percent by weight of the glass article.

12. The method of claim 10 wherein the glass article being strengthened initially comprises by weight on the oxide basis:
   34 to 52 percent $SiO_2$
   12 to 20 percent $Na_2O$
   2 to 9 percent $K_2O$
   8 to 15 percent $Al_2O_3$
   0 to 9 percent $ZrO_2$
   10 to 23 percent $(Al_2O_3 + ZrO_2)$
   10 to 20 percent $P_2O_5$
   2 to 8 percent $ZnO$
   0 to 0.1 percent $Li_2O$
said constituents comprising at least 90 percent by weight of the glass article.

13. The method of claim 10 wherein said contacting and heating step are continued for no more than one hour and thereby produce a compression layer at least 50 microns deep at the surface of the glass.

14. The method of claim 13 wherein the compression layer produced is at least 100 microns deep.

15. The method of claim 13 wherein the abraded rod modulus of rupture for the glass is at least doubled by the ion exchange treatment.

16. The method of claim 10 wherein the source of potassium ions is a molten bath of $KNO_3$.

* * * * *